UNITED STATES PATENT OFFICE.

RICHARD F. KINSLEY, OF EAST CLEVELAND, JOHN D. MORRON, OF LAKEWOOD, AND CHARLES R. HAYNES, OF CLEVELAND, OHIO, ASSIGNORS TO MECHANICAL RUBBER COMPANY, A CORPORATION OF OHIO.

PROCESS FOR RECOVERING RUBBER WASTE.

1,215,941.  Specification of Letters Patent.  Patented Feb. 13, 1917.

No Drawing.  Application filed February 1, 1915.  Serial No. 5,507.

*To all whom it may concern:*

Be it known that we, RICHARD F. KINSLEY, JOHN D. MORRON, and CHARLES R. HAYNES, all citizens of the United States, and residents, respectively, of East Cleveland, Lakewood, and Cleveland, in the county of Cuyahoga, State of Ohio, have jointly invented certain new and useful Improvements in Processes for Recovering Rubber Waste, of which the following is a full, clear, and exact description.

This invention relates particularly to the recovery and utilization of rubber waste or scrap, containing fibrous material which is produced by clippings in the manufacture of such articles as rubber hose, belting, packing, tire fabrics, rubber boots, shoes, and other articles of mechanical use, or of clothing. Similar worn or discarded articles may also be treated and the rubber and fibrous material utilized and recovered by our improved process.

The object of our invention is to produce a process which will result in a material saving in ingredients and chemicals employed and also in the amount of labor, power, heat, washing and other handling, such as required in other processes heretofore in use. Other advantages will be more specifically pointed out hereinafter and the process from which they result will be claimed in the claims forming a part of this specification.

In reclaiming rubber containing fabric and similar materials, in accordance with this invention, the process comprises: First, mascerating the material, after which it is placed in a large tank or tub. Such tank may be in the form of a vat which is heated in any well known way and which is provided with an opening in the bottom to draw off the contents; next, the material is mixed with an aqueous solution of sulfuric acid in the vat. A 25% solution of acid is preferred, but this may be varied to suit different conditions, depending upon the composition of the waste to be treated. The mass is then heated until the fiber in the rubber mass is disintegrated and its fibrous nature destroyed. The contents of the tank is then neutralized by the addition of a suitable base of the alkaline earths, such as powdered lime, the amount of lime required being adapted to change the sulfuric acid and calcium hydroxid into calcium sulfate and water. A slight excess of basic material is added in order that no traces of free acid may remain in the compound. The addition of this dry powder very nearly absorbs all the moisture or water in the mixture and any surplus which may remain in the mixture is drawn off through a suitable opening in the vat or tank. This water, with whatever chemicals may be carried with it, is caught in suitable receptacles and the rest of the mixture is removed from the vat and spread on a suitable drying floor to facilitate its further working. The liquor previously drawn off is then added to the mass and the whole worked together until it is substantially homogeneous. The mixture is allowed to dry until it contains a small amount of moisture, eight to ten per cent. having been found in actual practice to give good results, and then is mixed with a devulcanizing agent containing as one of its ingredients, a saponifiable oil. This devulcanizing agent may consists of a heavy mineral oil or grease. with or without the addition of resins or bituminous substances, together with a saponifiable oil, such as corn oil. During the step of devulcanization, the excess of lime or other alkali radicals present acts upon the oil, saponifying it and as a result there is practically no alkalinity in the mixture.

After thus preparing the compound, the mass of material—which now consists of an intimate mixture of devulcanized rubber compound, the various added chemicals and reagents and the products of their reactions, and a disintegration product made from the fibrous material present in the original substances,—is worked up to a manufacturing consistency by being dried and refined in a manner similar to other well known methods of handling devulcanized rubber compounds. It will be apparent that the sulfate radical of the acid and the disintegration product of the fiber might be recovered after treatment in the acid vat, by precipitation with lime in a setting tank, and removing the sludge, and filtering and drying it, but we prefer to accomplish substantially the same effect by simply adding the alkali and making use of the heat of chemical reactions.

By this process none of the ingredients are lost or wasted or have to be refined or treated for further use or sale. The calcium sulfate which is formed is a useful diluent or ingredient of the compound and is stable at the usual vulcanizing temperatures.

The manufacturing cost over previous methods is also very low, since no water is required for washing and consequently no power consumed by the necessary agitation while washing. Extraneous heat is not required for drying because of the heat of chemical reaction, which is sufficient to produce evaporation to a great extent, and also because the liquid ingredients are nearly all converted to solids or vapors by such reactions.

What we claim and desire to protect by Letters Patent is:

1. The process of recovering rubber waste containing fibrous material, which comprises treatment with acid and then neutralizing the acid with a suitable basic material, leaving within the mass so treated substantially all the added ingredients and the products of their reactions, except an excess of moisture.

2. The process of recovering rubber waste containing fibrous material, which comprises treatment with an acid, neutralizing the acid with a suitable basic material added in excess of the amount required to neutralize the acid, and then mixing therewith a substance which converts said excess of said basic material into a product not deleterious to rubber.

3. The process of recovering rubber waste containing fibrous material, which comprises subjecting the same to the action of an acid, neutralizing the acid with a suitable basic material added in excess of the amount required to neutralize the acid, and then mixing therewith a substance which converts said excess of said basic material into a product not deleterious to rubber, leaving within the mass so treated, substantially all the added ingredients and the products of their reactions, except an excess of moisture.

4. The process of recovering rubber waste containing fibrous material, which comprises disintegrating the fibrous material by treatment with acid, adding a suitable base of an alkaline earth in excess of the amount of an alkaline earth in excess of the acid, and then sufficient to neutralize the acid, and then adding saponifiable oil to be saponified by the excess of said base and to effect devulcanization.

5. The process of recovering rubber waste containing fibrous material, which comprises dividing the waste into small particles, disintegrating the fibrous material by treatment with acid, neutralizing the acid with a suitable base of an alkaline earth, working the resultant solid and liquid components into a homogeneous mass, and then adding a devulcanizing agent and a saponifiable oil.

6. The process of recovering rubber waste containing fibrous material, which comprises dividing the waste into small particles, disintegrating the fibrous material by adding sulfuric acid, neutralizing the acid by the addition of a base of an alkaline earth in powdered form, working the resultant solid and liquid components into a homogeneous mass, and then adding a devulcanizing agent and a saponifiable oil.

7. The process of recovering rubber waste containing fibrous material, which comprises dividing the waste into small particles, disintegrating the fibrous material by adding sulfuric acid, neutralizing the acid by the addition of a base of an alkaline earth in powdered form, working the resultant solid and liquid components into a homogeneous mass, evaporating the same to a point leaving about ten per cent. moisture and then adding a devulcanizing agent and a saponifiable oil.

Signed this 25th day of January, 1915.

RICHARD F. KINSLEY.
JOHN D. MORRON.
CHARLES R. HAYNES.

Witnesses:
W. J. DENCKER,
W. S. WESTWOOD.